(12) United States Patent
Phillips, III

(10) Patent No.: US 8,388,150 B2
(45) Date of Patent: *Mar. 5, 2013

(54) OPTICAL ELEMENT HAVING A TORIC SURFACE

(75) Inventor: William E. Phillips, III, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,353

(22) Filed: Feb. 15, 2012

(65) Prior Publication Data

US 2012/0147339 A1  Jun. 14, 2012

Related U.S. Application Data

(63) Continuation of application No. 12/276,818, filed on Nov. 24, 2008, now Pat. No. 8,136,947.

(60) Provisional application No. 60/991,553, filed on Nov. 30, 2007.

(51) Int. Cl.
  *G03B 21/28* (2006.01)

(52) U.S. Cl. ............... 353/99; 353/31; 353/33; 353/39; 353/81; 353/98; 353/101; 353/119; 353/122; 359/485.07; 359/489.09; 359/629

(58) Field of Classification Search ............ 353/20, 353/31, 33, 37, 39, 81, 98, 99, 101, 119, 353/122; 359/487, 488, 495, 500, 639, 640, 359/668, 669, 670, 671, 485.01, 485.02, 359/485.07, 489.08, 489.01, 489.11, 489.12, 359/489.13; 349/5, 7, 8, 9

See application file for complete search history.

(56) References Cited

U.S. PATENT DOCUMENTS

| 3,850,516 A |   | 11/1974 | Mallinson |
| 4,406,520 A |   | 9/1983 | Sato |
| 5,121,213 A |   | 6/1992 | Nishioka |
| 5,134,513 A | * | 7/1992 | Morimoto ............ 359/212.1 |
| 5,513,001 A | * | 4/1996 | Ohtomo et al. ........ 356/249 |
| 5,742,438 A |   | 4/1998 | Conner |
| 5,781,676 A | * | 7/1998 | Okada ................... 385/31 |
| 6,007,223 A | * | 12/1999 | Futami ................. 362/517 |
| 6,062,695 A |   | 5/2000 | Kakuda |
| 6,137,617 A |   | 10/2000 | Yoshikawa |

(Continued)

FOREIGN PATENT DOCUMENTS

CN 1175299 C 11/2004
EP 1411379 4/2004

(Continued)

OTHER PUBLICATIONS

International Search Report for PCT/US2008/083313, mailed May 11, 2009, 7 pages.

(Continued)

*Primary Examiner* — Georgia Y Epps
*Assistant Examiner* — Sultan Chowdhury
(74) *Attorney, Agent, or Firm* — Kristofor L. Storvick

(57) ABSTRACT

An image forming system is described that includes a light source that provides a light beam and an anamorphic refractive optical element. A first outer surface of the anamorphic element faces the light source and includes a toric surface. The light beam is incident upon the first outer face and then an incident surface of the anamorphic element. The anamorphic element directs the light beam to an image forming device. An illumination system is also described where an anamorphic element includes a toric surface and a facet surface.

9 Claims, 11 Drawing Sheets

U.S. PATENT DOCUMENTS

| | | | |
|---|---|---|---|
| 6,147,802 A * | 11/2000 | Itoh et al. | 359/242 |
| 6,341,867 B1 | 1/2002 | Itoh | |
| 6,421,184 B1 * | 7/2002 | Togino | 359/636 |
| 6,563,648 B2 | 5/2003 | Gleckman | |
| 6,643,077 B2 | 11/2003 | Magarill | |
| 6,729,730 B2 * | 5/2004 | Ito | 353/20 |
| 7,034,973 B2 | 4/2006 | Sakai | |
| 7,048,388 B2 * | 5/2006 | Takaura et al. | 353/99 |
| 7,070,281 B2 | 7/2006 | Kato | |
| 7,101,050 B2 * | 9/2006 | Magarill et al. | 353/97 |
| 7,350,928 B2 * | 4/2008 | Liao et al. | 353/81 |
| 7,362,507 B2 | 4/2008 | Duncan | |
| 7,452,086 B2 * | 11/2008 | Li | 353/98 |
| 7,524,074 B2 * | 4/2009 | Chery et al. | 362/26 |
| 7,529,029 B2 | 5/2009 | Duncan | |
| 7,901,083 B2 | 3/2011 | Destain | |
| 7,920,331 B2 | 4/2011 | Inoue | |
| 7,935,920 B2 * | 5/2011 | Yamauchi et al. | 250/216 |
| 2003/0214694 A1 | 11/2003 | Sakai | |
| 2004/0252478 A1 | 12/2004 | Li | |
| 2005/0012996 A1 | 1/2005 | Miyazawa | |
| 2005/0180030 A1 | 8/2005 | Lu | |
| 2006/0209553 A1 | 9/2006 | Albou | |
| 2007/0023941 A1 | 2/2007 | Duncan | |
| 2007/0024981 A1 | 2/2007 | Duncan | |
| 2007/0030456 A1 | 2/2007 | Duncan | |
| 2007/0085973 A1 | 4/2007 | Duncan | |
| 2007/0152231 A1 | 7/2007 | Destain | |
| 2008/0049190 A1 | 2/2008 | Destain | |
| 2009/0185144 A1 | 7/2009 | Grasser | |

FOREIGN PATENT DOCUMENTS

| | | |
|---|---|---|
| EP | 1763254 | 3/2007 |
| EP | 1763254 A2 | 3/2007 |
| WO | WO 99-52008 | 10/1999 |
| WO | WO 2007-016199 | 2/2007 |

OTHER PUBLICATIONS

Written Opinion for PCT/US2008/083313, 8 pages.

* cited by examiner

OPTICAL ELEMENT HAVING A TORIC SURFACE

This application is a continuation of U.S. application Ser. No. 12/276,818, filed on Nov. 24, 2008 now U.S. Pat. No. 8,136,947, published as U.S. Patent Application Publication No. 2009/0141503, now allowed, which claims the benefit of U.S. Provisional patent application Ser. No. 60/991,553, filed Nov. 30, 2007, the contents of which is hereby incorporated by reference in its entirety.

BACKGROUND

Optical projectors are used to project images onto surfaces for viewing by groups of people. Optical projectors include optical projector subsystems that include lenses, filters, polarizers, light sources, image forming devices and the like. Fixed front and rear electronic projectors are known for use in education, home theaters, and business meetings. Known light sources include black body lamps, gas discharge lamps, and solid state sources such as lasers, light emitting diodes (LED's) and organic light emitting diodes (OLED's). Head mounted displays are known for individual use. For mobile applications, there is a desire to miniaturize the volume and thickness of optical projectors, and make them power efficient while maintaining low power consumption, low cost and high image quality. However, the large dimensions and high power consumption of existing optical projection subsystems limit efforts to create a truly portable projector. Optical projection subsystems and methods of making subsystems are needed that provide both miniaturization and efficiency to project good quality images in a cost effective manner.

SUMMARY

In one embodiment, an image forming system includes a light source that provides a light beam and an anamorphic refractive optical element. The anamorphic element includes a first outer surface for facing the light source and an incident surface. The first outer surface includes a toric surface. The anamorphic element is configured so that the light beam is incident on the first outer surface and then the incident surface. The system further includes an image forming device, where the anamorphic optical element directs the light beam to the image forming device.

In another embodiment, an illumination system includes a light source that provides a light beam and an anamorphic refractive optical element. The anamorphic element includes a first outer surface for facing the light source. The first outer surface includes a toric surface and a first facet cut surface.

In yet another embodiment, a method of making an anamorphic component of an illumination system includes the steps of providing a portion of lens material having an edge surface, rotating the portion of lens material about a first rotation axis, and while the portion is rotating, cutting into the edge surface to form a toric surface. The method further includes the step of cutting a first facet cut surface in the toric surface.

This Summary is provided to introduce a selection of concepts in a simplified form that are further described below in the Detailed Description. This Summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

The present invention is applicable in the context of image forming systems. One example of a context where the present invention is particularly applicable is projection systems, especially mobile projections systems.

There are many different configurations for projection systems, but several have in common that they direct a light beam from a light source to a reflective or transmissive image forming device which includes an image forming panel. These different image forming devices commonly use an anamorphic optical element to transform a light beam from a light source with a first aspect ratio to a light beam with a second aspect ratio that matches an image forming panel. Typically, the light source has a square aspect ratio of 1:1. In various examples, the image forming panel has a rectangular aspect ratio of 16:9 or 4:3, or other rectangular aspect ratios.

Figure 1:
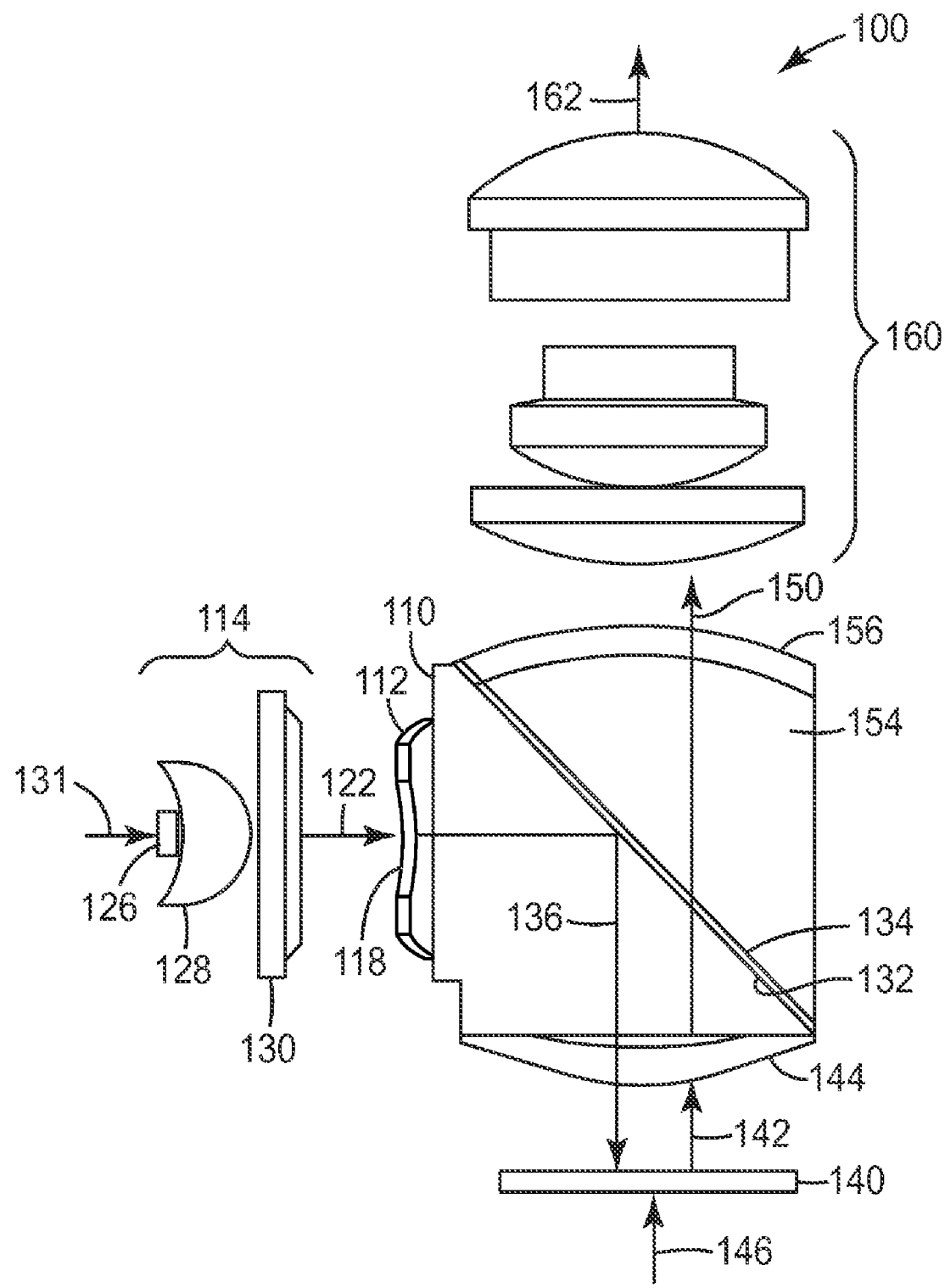
FIG. 1 is a top view of one embodiment of a mobile projection system including a faceted optical element having a toric surface on its entrance face.

The anamorphic element typically compresses the light beam in one direction in order to achieve the altered aspect ratio. An exemplary anamorphic refractive optical element that serves this purpose is illustrated in FIG. 1 in the context of an image forming system 100. The refractive optical element 110 includes a first outer surface 112 that faces a light source 114. The outer surface 112 includes a toric surface portion 118. It has been discovered that the toric surface is especially useful for directing light from the light source toward the center of the element. Particularly, light that impacts the top and bottom portions of the first outer surface 112, as oriented in FIG. 1, will be directed toward the center.

A toric surface is a surface of a torus, where a torus is a shape formed by the revolution of a curve or line about an exterior line lying in the same plane as the line. One common torus is the donut-shape generated by the revolution of a circle. The term torus, however, refers to any shape generated by the revolution of a conic. A conic is a curve or a non-straight line, formed by the intersection of a plane with a right circular cone, including an ellipse, a parabola, and a hyperbola. As the terms toric and toroid are used in this application, the curve used to generate the torus can be described by polynomials, as is the case in the example shown in the FIGS. Additional aspects of the first outer surface will be further described herein, after a description of projector systems in which the anamorphic element is used.

Refractive optical elements for providing a rectangular aspect ratio are used in many different types of projector systems. One example of a reflective image forming device is an image panel using liquid crystals on silicon (LCoS). Light reflects from the LCoS image panel to form an image beam. Another example of a reflective image panel is a digital micromirror device (DMD) that is made up of a matrix of microscopic mirrors, where each mirror represents one or more pixels in the projected image. The mirrors can be moved quickly from an on-position in which they reflect light to an off-position where they direct light to an absorbing element. Some transmissive systems use light gates that open or close to allow light to pass or to block light for individual pixels. Another example of a transmissive system is a high-temperature polysilicon liquid crystal device (HTPS-LCD) imager.

FIG. 1 illustrates the anamorphic refractive optical element 110 in the context of an example of a reflective projection system 100, such as a system with an LCoS panel. This system will be described initially to provide context for understanding the operation of the refractive optical element 110. The light source 114 provides a light beam 122 and includes a solid state light emitter 126, a collection lens 128 and a collimator 130. The solid state light emitter 126 receives electrical power 131 and thermally couples to a heat sink, which is not shown. In one example, the light beam 122 comprises incoherent light. In another example, the solid state light emitter 126 comprises one or more light emitting diodes (LED's). In one example, the collection lens 128 is a hyper-hemispheric ball lens as taught in U.S. Patent Publication No. 2007/0152231, the contents of which are hereby incorporated by reference in its entirety for any purpose.

In this example, the collimator 130 includes a focusing unit incorporating a first Fresnel lens having a first non-faceted side for receiving a first non-collimated beam and a first faceted side for emitting the collimated beam.

The collimator 130 directs the light beam 122 to the refractive element 110. The first outer surface 112 of the refractive element 110 faces the light source. In the example of FIG. 1, the incident surface 132 includes a polarizing filter 134 to form a polarized beam 136 having a first polarized component which is directed toward an image panel 140. The anamorphic element 110 acts as a polarizing beam splitter (PBS) in this example. In this configuration, the refractive element 110 is a multifunction optical component that functions as a polarizing element as well as a lens, and functions as an anamorphic element. This combination of functions prevents losses that would otherwise occur at air interfaces between separate components that provide these functions.

In various embodiments, the polarizing filter is an absorptive polarizer, or a reflective polarizer such as a wire grid polarizer, birefringent polarizer or a thin film polarizer. In the arrangement illustrated in FIG. 1, polarizing filter 134 is a reflective polarizing layer that directs a polarized beam 136 including primarily light of a first polarization toward the image panel 140. A second polarized component passes through the polarizing filter 134. The polarized beam 136 exits the refractive element through a second outer surface 144. In one example, the second outer surface 144 has a non-zero lens power and is a curved lens surface, such as a convex surface. The second outer surface is an aspheric convex lens in the example of FIG. 1.

The image forming panel 140 receives image data and electrical power from an electrical input bus 146. The polarized beam 136 is incident upon the panel 140 which reflects light according to the image data. A modified beam 142 is reflected from the panel 140 with polarization states that are modified relative to the polarization of the polarized beam 136 on a pixel-by-pixel basis according to the image data. For pixels where the image is bright, the polarization state is modified, while for areas of the panel where the image is dark, the polarization state is not modified. The image beam 150 is composed of the polarization components of modified beam 142 that pass through the refractive element 110 and through the polarizing filter 134.

The refractive element 110 is positioned immediately adjacent to a lens element 154, having a first outer surface 156. In the example of FIG. 1, there is no air gap between the refractive element 110 and the lens element 154. The image beam 150 passes through the lens element 154 to a projection lens assembly 160. The projection lens assembly 160 provides an image projection beam 162 suitable for viewing. A commonly owned, co-pending patent application titled "Optical Projection System", having application Ser. No. 11/831,307, filed Jul. 31, 2007 provides additional details about many aspects of exemplary projection systems in which the refractive element having a toric surface could be utilized. This application is hereby incorporated herein by reference in its entirety for any purpose.

In some embodiments, color is imparted to the projection light beam using color sequencing such as by the action of a color wheel. Alternatively, three image panels can be used that are each illuminated with a primary color. Alternatively, color filters can be incorporated into the picture elements of image forming panel 140.

Figure 2:
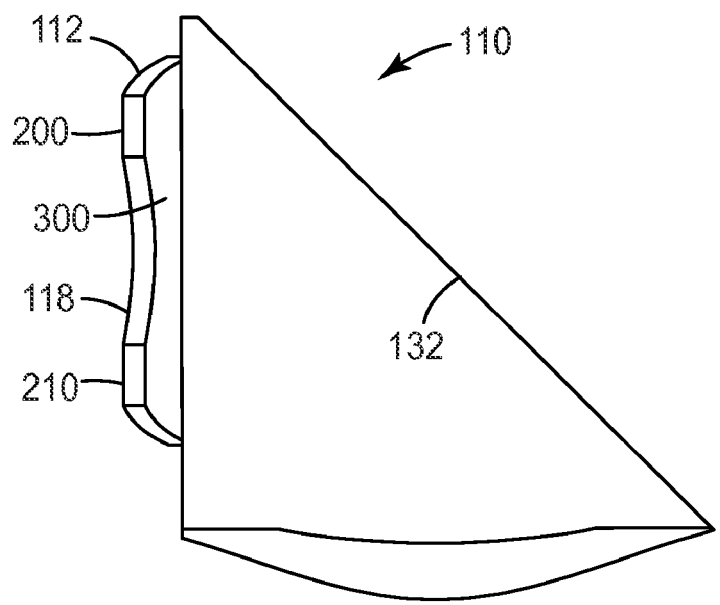
FIG. 2 is a top view of the optical element of FIG. 1.
Figure 3:
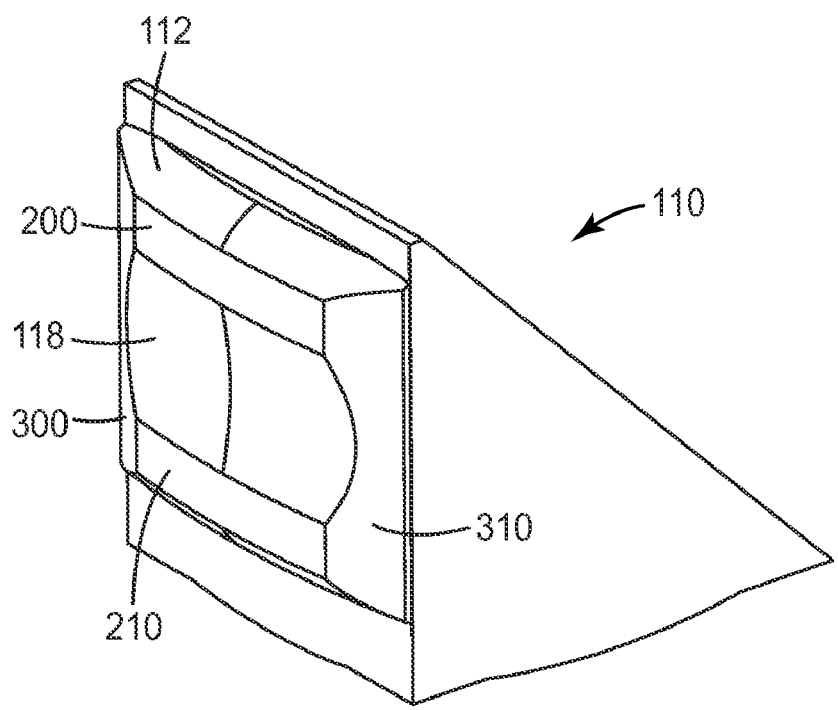
FIG. 3 is a perspective view of the optical element of FIG. 2.

The first outer surface 112 will now be described in further detail. FIG. 2 is a side view and FIG. 3 is a perspective view of the refractive element 110 having a toric surface portion 118. Compared to having a cylindrical surface shape for the first outer surface, the toric surface provides additional mixing of light and a more efficient system. If a pure cylindrical surface is provided, the light spreads out farther in the vertical direction as oriented in FIG. 1. The toric surface portion 118 is more effective at directing light from the top and bottom portions of the first outer surface 112, as oriented in FIG. 1, toward the center of the incident surface 132.

Figure 4:
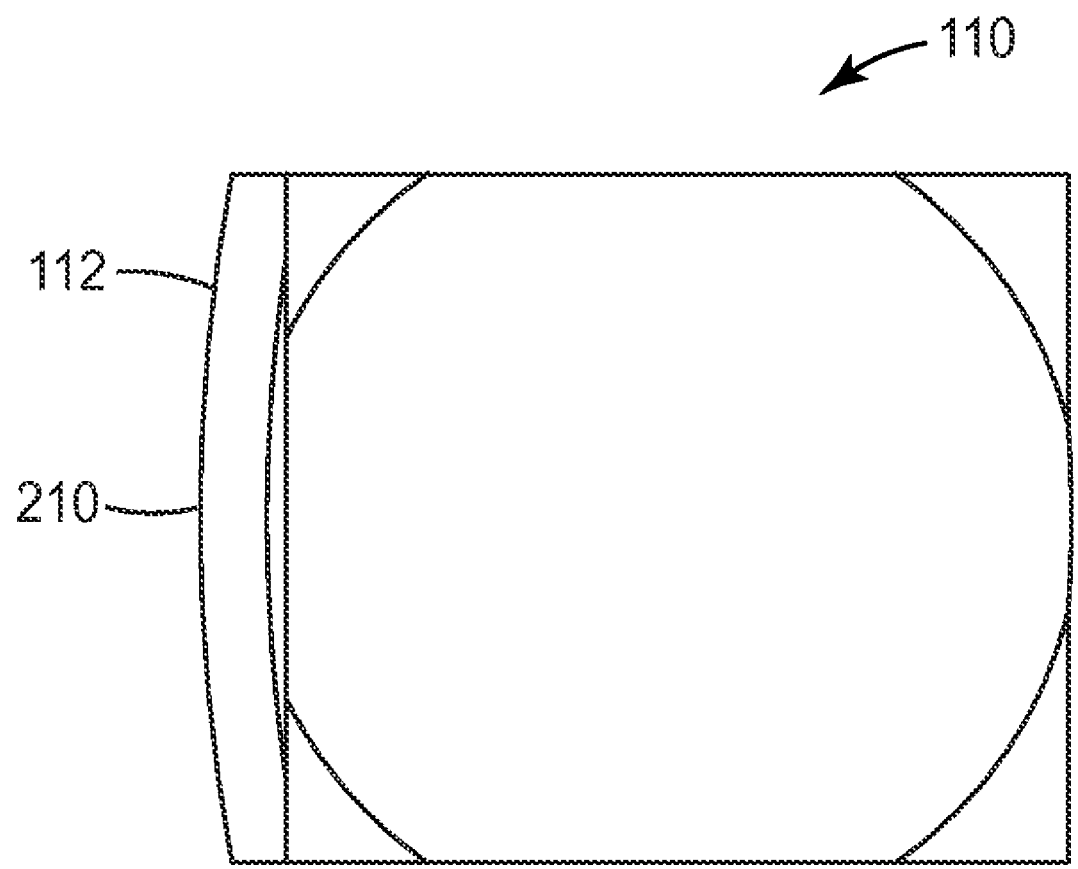
FIG. 4 is a side view of one embodiment of an optical element having a toric surface.

Now referring to FIGS. 2-3, the first outer surface 112 includes a toric surface portion 118 framed by facet cut surfaces 200, 210, 300 and 310. In alternative embodiments, the first outer surface is provided with one, two, three, five, six or other numbers of facet cut surfaces. In one embodiment, one or more of the facet cut surfaces have cylindrical surfaces. In one embodiment, the radius of one cylindrical facet cut surface is different than at least one other cylindrical facet cut surface. In the embodiment of FIG. 3, a first facet cut surface has two portions: The first top facet cut surface portion 200 and the second bottom facet cut surface portion 210 are cylindrical surfaces having the same radius. A second facet cut surface also has two portions: The first left facet cut surface portion 300 and the second right facet cut surface portion 310 are also both cylindrical surfaces having the same radius as each other, but different from the radius of the first and second facet cut surface. FIG. 4 is a bottom view of the refractive element 110, where an edge of the second bottom cylindrical facet cut surface portion 210 is visible. It is understood that the orientation references in the application, such as top, bottom, left and right, refer to the orientation as shown in the FIG. that is being discussed, and that these orientations are not required or even accurate when the systems are in use.

FIGS. 5-8 are views of the refractive element 110 at different stages of its formation. More detail will be provided about an exemplary first outer surface 112 by describing an exemplary method for forming the surface. In one exemplary method, a portion of element or lens material is initially provided. The material portion is shaped while spinning in this exemplary formation method, preferably using a lathe. In one embodiment, the material of the refractive element is a plastic resin material. U.S. Published Patent Application 2007/0030456 provides additional detail regarding the materials and formation methods that can be used for the anamorphic refractive element 110, and is hereby incorporated by reference in its entirety for any purpose. The material portion is provided in a disk shape in one embodiment and is rotated about the axis of the disk by the lathe. Alternatively, another shape of material portion is used and is provided along with a fixture for rotating the material portion about an axis. Next, the material portion is rotated about a first axis. While the portion is rotating, a cut is made into an edge surface to form a toric surface. In various embodiments, the distance from the axis of rotation to the material portion edge is greater than 20 mm, greater than 30 mm, less than 40 mm, less than 35 mm, 32 mm, or 32.25 mm.

Figure 5:
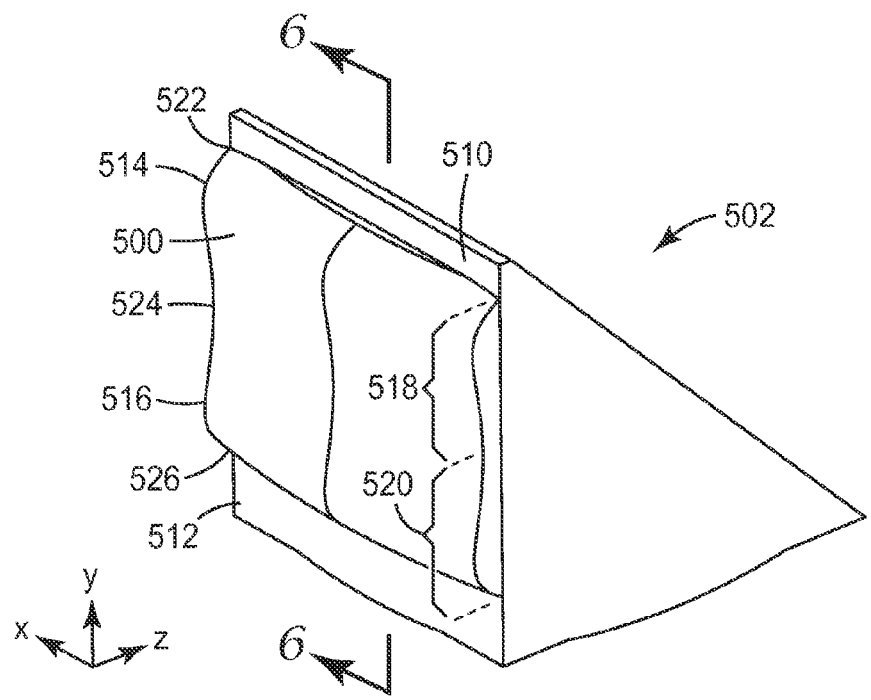
FIG. 5 is a perspective view of an optical element having a toric surface, which is an intermediate form during the manufacture of the optical element of FIG. 2.
Figure 6:
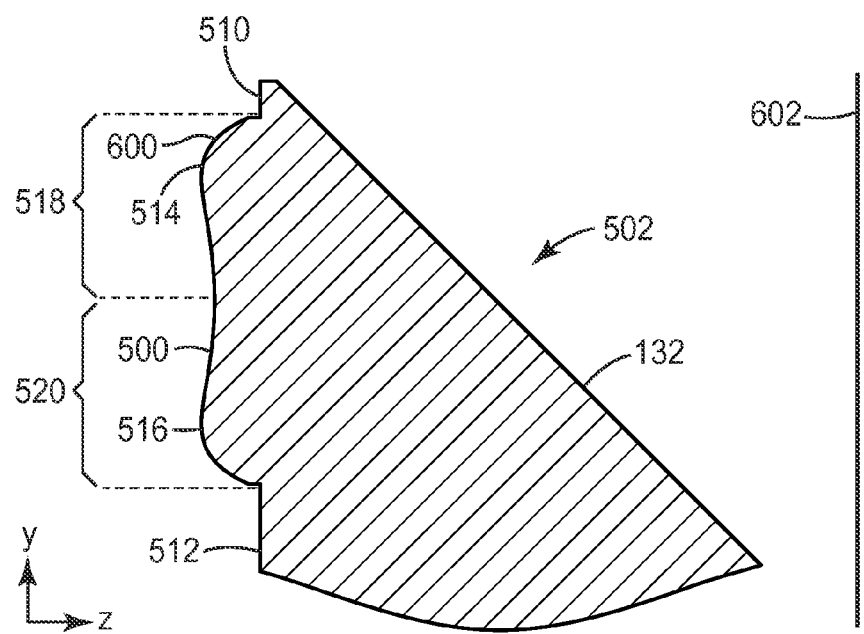
FIG. 6 is a cross-sectional view of the optical element of FIG. 5, along line 6-6 in FIG. 5.

The resulting cut toric surface 500 in a material portion 502 is shown in a perspective view in FIG. 5 and in cross-section in FIG. 6. Flat surfaces 510 and 512 are used to secure the material portion 502 in a holder. The toric surface 500 of this embodiment is formed by rotation of a line or curve described by a polynomial equation.

The cross-section of FIG. 6 shows the curve or profile 600 used to generate the toric surface 500. The profile is described by:

$$z = \frac{cy^2}{1+[1-(1+k)c^2y^2]^{1/2}} + Dy^4 + Ey^6 + Fy^8 + Gy^{10} + Hy^{12} + Iy^{14} \ldots$$

Where the y-axis and z-axis are shown in FIG. 6, the values of the z and y are expressed in millimeters, and the other variables in the equation have the following values:

| c | k | D | E | F | G | H | I |
|---|---|---|---|---|---|---|---|
| −11 mm. | 0 | −3.00 × $10^{-4}$ | 1.45 × $10^{-4}$ | −4.00 × $10^{-7}$ | 2.00 × $10^{-8}$ | 0 | 0 |

This equation is a polynomial equation as that term is commonly used in optical design. The variable c is the radius of curvature in the y-z plane of the center portion of the toric surface. In this example, c is a negative value correlating to a concave surface at the center portion of the profile. The variable k indicates what type of cross-section of a cone is used to generate the primary shape of the toroid, where 0 indicates a circle, 1 indicates a parabola and −1 indicates a hyperbola. In the example profile described by the equation above, the variable k is zero, indicating that the primary profile component is a circle. The terms beyond the first term in the equation modify the circle in the example above. The series can continue with higher power terms. For the example shown in the FIGS., the series was truncated at the $10^{th}$ order term. The axis of revolution 602 of the torus is illustrated in FIG. 6 and is perpendicular to the plane of the image panel 140 shown in FIG. 1.

Figure 7:
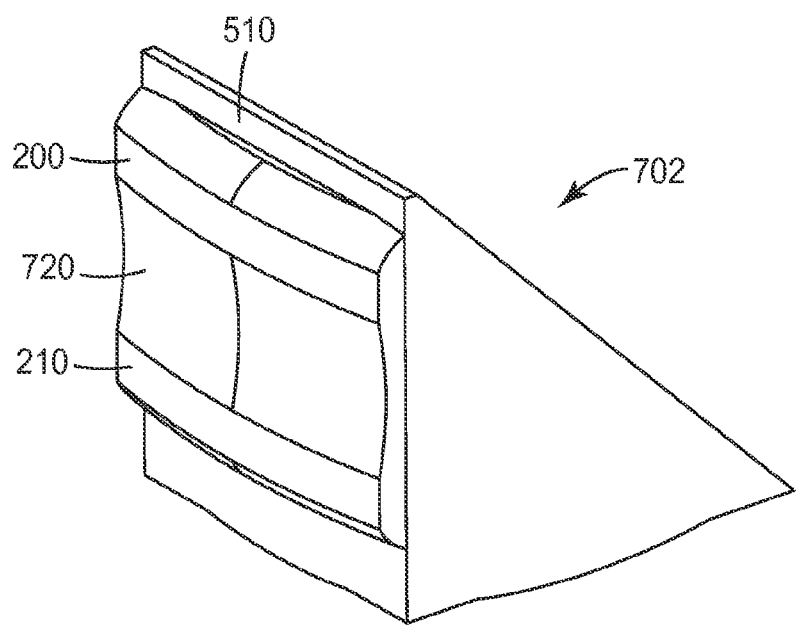
FIG. 7 is a perspective view of an optical element having a toric surface with cylinder facet cuts, which is another intermediate form during the manufacture of the optical element of FIG. 2.
Figure 8:
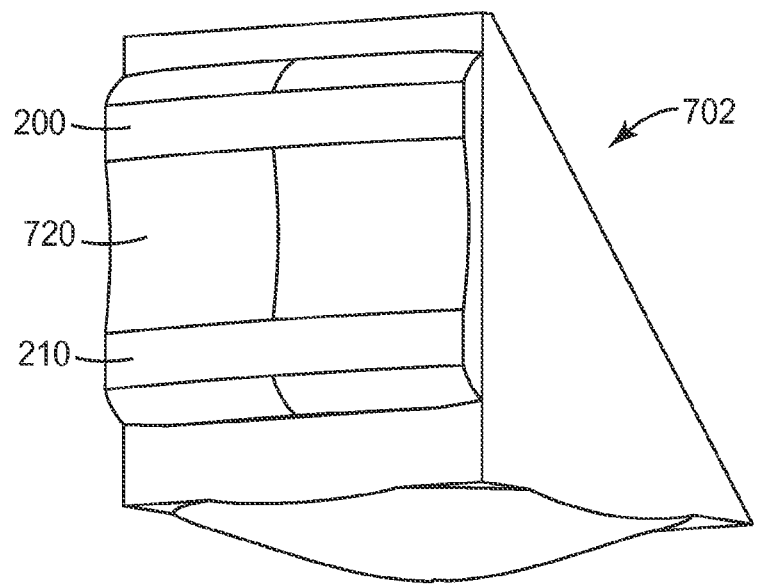
FIG. 8 is another perspective view of the element of FIG. 7.

Once the toric surface 500 is generated, next, the first facet cut surface 200 and second facet cut surface 210 are created. A facet is a distinct portion of a surface which is at an angle compared to adjacent surfaces. The piece of material 502, shown in FIG. 5 is rotated about an axis of rotation and a lathe is used to cut a cylindrical surface into the toric surface 500. In some embodiments, only one cylindrical surface facet cut is made in the toric surface 500. In the embodiment of FIGS. 7 and 8, a first facet cut surface is shown, which has portions 200 and 210, so that a toric surface portion 720 lies between them. The first facet cut surface portions 200 and 210 have cylindrical surfaces. In one embodiment, the axis of the cylinder is the same as for the toric surface, axis 602. In various embodiments, the radius of the cylindrical surface of the first and second cut facet surfaces is greater than 20 mm, greater than 30 mm, less than 40 mm, less than 35 mm, 32 mm, or 32.25 mm.

The facet cut surfaces 200, 210 provide additional light mixing effects and more uniform illumination over the desired aspect ratio than without the facet cut surfaces. The toric surface 500 of FIG. 5 without any facet cuts results in a light distribution that has some brighter bands. The toric surface 500 of FIGS. 5 and 6 includes first ridge 514 and second ridge 516, which in profile have bent line profiles 518 and 520. The ridges 514 and 516 cause the brighter bands to be present spaced from a midline of the incident surface 132. To break up those bands and distribute light more uniformly, the first and second facet cuts 200 and 210 are provided.

The next step is to take the material portion 702 of FIGS. 7 and 8 and make an additional facet cut 300 and 310 as shown in FIG. 3. This second facet cut surface has portions 300 and 310 that further break up the light distribution and result in a more uniform light distribution than without this facet cut.

Regarding the formation method, if the first facet cuts 200 and 210 were formed on a disk-shaped piece of material, then the wedge shape of the refractive element 110 is cut out of the disk to form a material portion shaped like material portion 702. The piece of material 702 from FIG. 7 is rotated about an axis of rotation and a lathe is used to cut a cylindrical surface into the toric surface 720 and first and second facet cuts 200 and 210. In the embodiment of FIG. 3, the second facet cut surfaces 300 and 310 are made, so that a remaining toric surface portion 118 lies between them. The second facet cut surfaces 300 and 310 have cylindrical surfaces. In one embodiment, the radius of the cylindrical surface of the second cut surfaces is the same and is less than the radius of the cylindrical surface of the first facet cut surfaces. In various embodiments, the radius of the cylindrical surface of the second facet cut surfaces is greater than 2 mm, greater than 8 mm, less than 20 mm, less than 15 mm, 10 mm or 11 mm.

Figure 9:
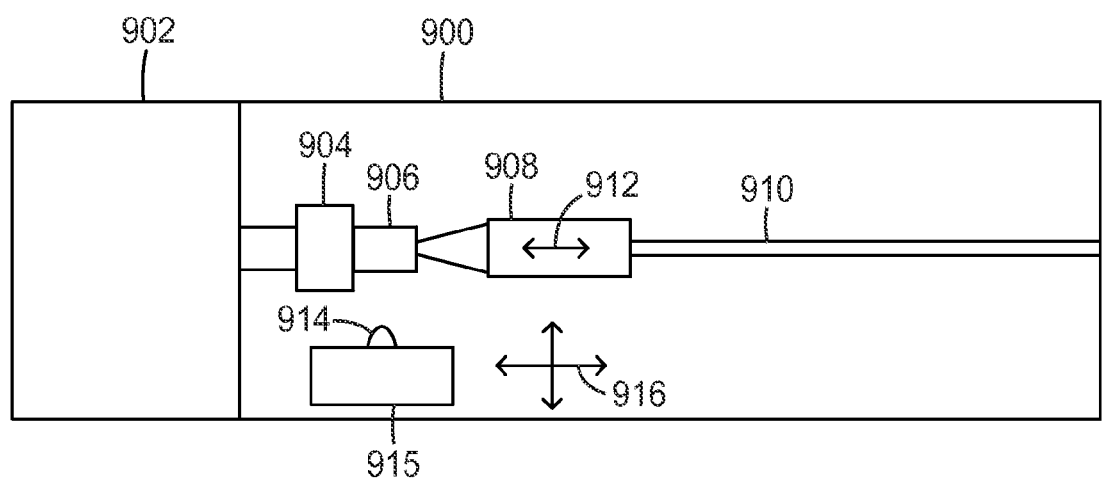
FIG. 9 is a schematic drawing showing a 2½ axis lathe that is used to manufacture a lens having a toric surface with added cylindrical facets in one embodiment of the invention.

The refractive element 110 illustrated in FIG. 3 can be manufactured using a 2 axis lathe, and does not require a more complex lathe for manufacturing. FIG. 9 is a schematic drawing of an exemplary lathe 900 that is used to manufacture the refractive element 110. In the lathe, a headstock 902 causes a spindle 904 to spin. The work piece 906 to be cut is affixed to the spindle 904 so that the work piece 906 can be spun about an axis of rotation during cutting. The work piece 906 is either attached to the spindle 904 or is attached using a fixture. One side of the fixture or work piece is provided with support by a tailstock 908. The tailstock can be moved toward and away from the work piece along track 910, as indicated by arrows 912, to provide support to the work piece 906. A cutting tool 914 is positioned along side the work piece on a tool rest 915. The cutting tool can be moved toward and away from the work piece, as well as moved side to side in relation to the work piece, as indicated by arrows 916. Lathe 900 is referred to as a 2-axis lathe because the cutting tool can move along 2 axes, as indicated by arrows 916. This type of lathe is also sometimes referred to as a 2½ axis or a 3 axis lathe, where the ½ axis or third axis refers to the rotation of the work piece. More complex 5-axis lathes are configured so that the cutting tool is also capable of moving up and down with respect to the plane of FIG. 9 and capable of tilting.

When cutting the toric surface 500 shown in FIG. 5, the cutting tool moves along the radial edge of a material disk, or along a cylindrical surface of a portion of material held in a fixture, to impart the shape of the toric surface. The surface of the material or work piece that faces the cutting tool initially is therefore cylindrical. For the toric surface 500, the cutting tool starts at a first edge of the work piece 522 where it is cutting into the material, moves away from the disk over the ridge 514, and then into the material at the center of the edge to cut more deeply. Then the cutting tool moves away from the disk again over ridge 516, and then toward the disk as it approaches edge 526.

A molding process, such as injection molding, can be used to replicate the anamorphic refractive element 110. A diamond turning process or a glass casting process may also be used. While the anamorphic refractive optical elements have been shown as integral with, for instance, a polarizing beamsplitter or a TIR prism, one of skill in the art will recognize that the anamorphic refractive optical element may be formed separately and aligned with a polarizing beamsplitter or TIR prism. For instance, an anamorphic refractive optical element may be adhered to a PBS or a TIR prism using an optical adhesive, or may be aligned with a PBS or a TIR prism with air between the anamorphic optical element and the subsequent PBS or TIR prism.

Figure 10:
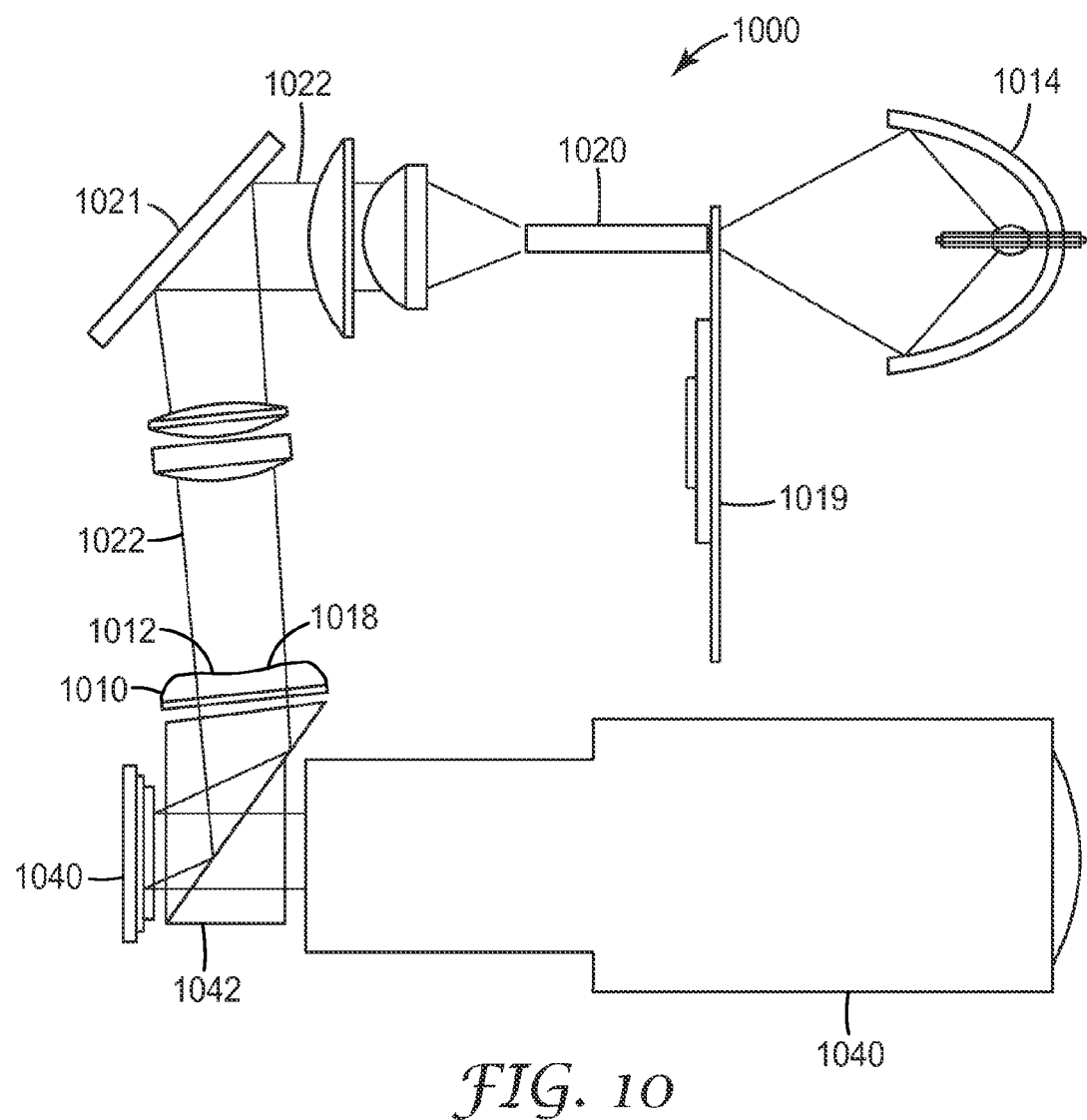
FIG. 10 is a top view of one embodiment of a mobile projection system having a digital micro-mirror imager and having an optical element with a toric surface.

FIG. 1 illustrates an anamorphic refractive element in a projection system configuration commonly used with an LCoS panel as the image forming panel. An anamorphic refractive element having a toric surface can be used in many other types of projection systems also. FIG. 10 is a top view of a projection system 1000 that uses a digital micro-mirror device (DMD) as its image panel 1040 and also has an anamorphic element 1010, where a first outer surface 1012 has a toric surface portion 1018. Examples of suitable DMD panels include products commercially available from Texas Instruments, Inc., (Plano, Tex.) under the trade designation Digital Light Processing (DLP). Many other configurations for DMD projection systems are possible with an anamorphic toric element, and FIG. 10 provides just one such example. The system 1000 of FIG. 10 includes a light source 1014, which directs light through a color wheel 1019, and then through an integrator rod 1020. A fold mirror 1021 directs a light beam 1022 toward a first outer surface 1012 of an anamorphic refractive element 1010.

The anamorphic refractive element 1010 transforms a light beam 1022 from a light source with a first aspect ratio to a light beam with a second aspect ratio that matches the DMD image forming panel 1040. Typically, the light source has a square aspect ratio of 1:1, but it is also possible for the light source to have a different aspect ratio. In various examples, the image forming panel has a rectangular aspect ratio of 16:9 or 4:3, or other rectangular aspect ratios. The anamorphic element 1010 operates in the same way as discussed above for the anamorphic element 110, and is capable of the various configurations discussed above for the anamorphic element 110, including having first and second facet cut surfaces, each having two portions, as shown in FIG. 3.

Referring again to FIG. 10, a light beam having the rectangular aspect ratio is directed by a total internal reflection (TIR) prism 1042 to impact the image forming panel 1040, where an array of tiny tilting mirrors is present. The tilt of each mirror is independently controlled by the data loaded into a memory cell associated with each mirror, so that the mirrors steer reflected light and spatially map a pixel of video data onto a pixel on a projection screen. Light reflected by a mirror in an ON state passes through a projection lens assembly 1060 and is projected onto a viewing surface to create a bright field. On the other hand, light reflected by a mirror in an OFF state misses the projection lens assembly 1060, which results in a dark field. Instead of using a single DMD image panel 1040 and color sequencing by the action of a color wheel, alternatively, three DMD image panels can be used that are each illuminated with a primary color.

Figure 11:
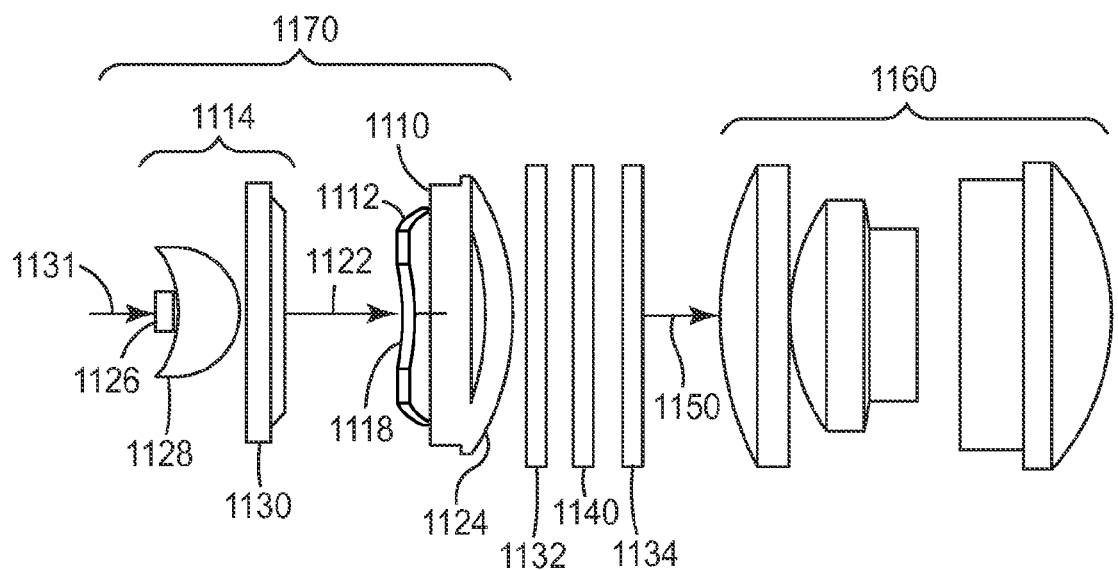
FIG. 11 is a top view of one embodiment of a mobile projection system having a transmissive polarized imager and having an optical element with a toric surface.

Another type of an image-forming device is a high temperature polysilicon liquid crystal device (HTPS-LCD). An HTPS-LCD also includes a liquid crystal layer, in which the alignment can be controlled incrementally (pixel-to-pixel), as determined by the data corresponding to a video signal. The liquid crystal layer is sandwiched between two glass substrates that contain an array of transparent electrodes, thus being adapted for operation in transmission. At the corner of each HTPS-LCD pixel, there is a microscopic thin film transistor. Non-HTPS transmissive liquid crystal devices also exist. FIG. 11 is a top view of one embodiment of a projection system 1100 having a transmissive LCD imaging panel 1140 and having an anamorphic optical element 1110 with a toric surface 1118. Many other configurations for projection systems with transmissive imaging panels are possible with an anamorphic toric element, and FIG. 11 provides just one such example. The system 1100 of FIG. 11 includes a light source 1114 that provides a light beam 1122 and includes a solid state light emitter 1126, a collection lens 1128 and a collimator 1130. The solid state light emitter 1126 receives electrical power 1131 and thermally couples to a heat sink, which is not shown. In one example, the light beam 1122 comprises incoherent light. In another example, the solid state light emitter 126 comprises one or more light emitting diodes (LED's). In one example, the collection lens 128 is a hyper-hemispheric ball lens as taught in U.S. Patent Publication No. 2007/0152231, the contents of which are hereby incorporated by reference in its entirety for any purpose. The light source 114 directs the light beam 1122 to a first outer surface 1112 of the anamorphic refractive element 1110.

The anamorphic refractive element 1110 transforms the light beam 1122 from a light source with a first aspect ratio to a light beam with a second aspect ratio that matches the image forming panel 1140. Typically, the light source has a square aspect ratio of 1:1. In various examples, the image forming panel has a rectangular aspect ratio of 16:9 or 4:3, or other rectangular aspect ratios. The anamorphic element 1110 operates in the same way as discussed above for the anamorphic element 110, and is capable of the various configurations discussed above for the anamorphic element 110, including having first and second facet cut surfaces, each having two portions, as shown in FIG. 3. The second outer surface 1124 is any shape needed to provide the desired lighting configuration to the image panel 1140.

A polarizing filter 1132 causes light having a first polarized component to be transmitted to the image panel 1140. The image forming panel 1140 receives image data and electrical power from an electrical input bus 1146. The polarized light is incident upon the panel 1140 and light is transmitted through the image panel according to the image data, and then passes through a second polarizing filter 1134 acting as a polarization analyzer. An image beam 1150 is transmitted by the panel 1140 and the polarizers 1132 and 1134, and then is provided to the projection lens assembly 1160.

An illumination system 1170 is illustrated in FIG. 11, incorporating the light source 1114 and the anamorphic element 1110, which can be used in many different application environments where it is desired to illuminate a rectangular area uniformly. This is desirable in medical and dental contexts, as well as many other situations. Such an illumination system may include other components depending on the specific application.

Many alternatives exist for the configurations of the projection systems and illumination systems described with respect to FIGS. 1, 10 and 11. For example, one illumination system has three separate light sources. Each separate light source emits a different primary color. This system could be used in combination with a color combiner element, such as a cross-dichroic combiner, such as known combiners composed of right-angled prisms coated with dichroic coatings. In one example, each light beam from each separate color source is directed through a hyper-hemispheric ball lens, then through a Fresnel element, and then into the color combiner. In one alternative, a color sequencer is used so that the desired color is radiated from the color combiner. In another alternative, mixed, white light emerges from the color combiner, and then is directed to an anamorphic element, and then to an imaging panel, with polarizers incorporated as needed for the particular imaging panel used. A color filter is used in the light path or in the picture elements of the image forming panel in this embodiment. Then the light is directed through an anamorphic element, to an imaging panel, and to projection optics, consistent with the arrangements shown in FIGS. 1, 10 and 11 for the different types of imaging panels.

Figure 14:
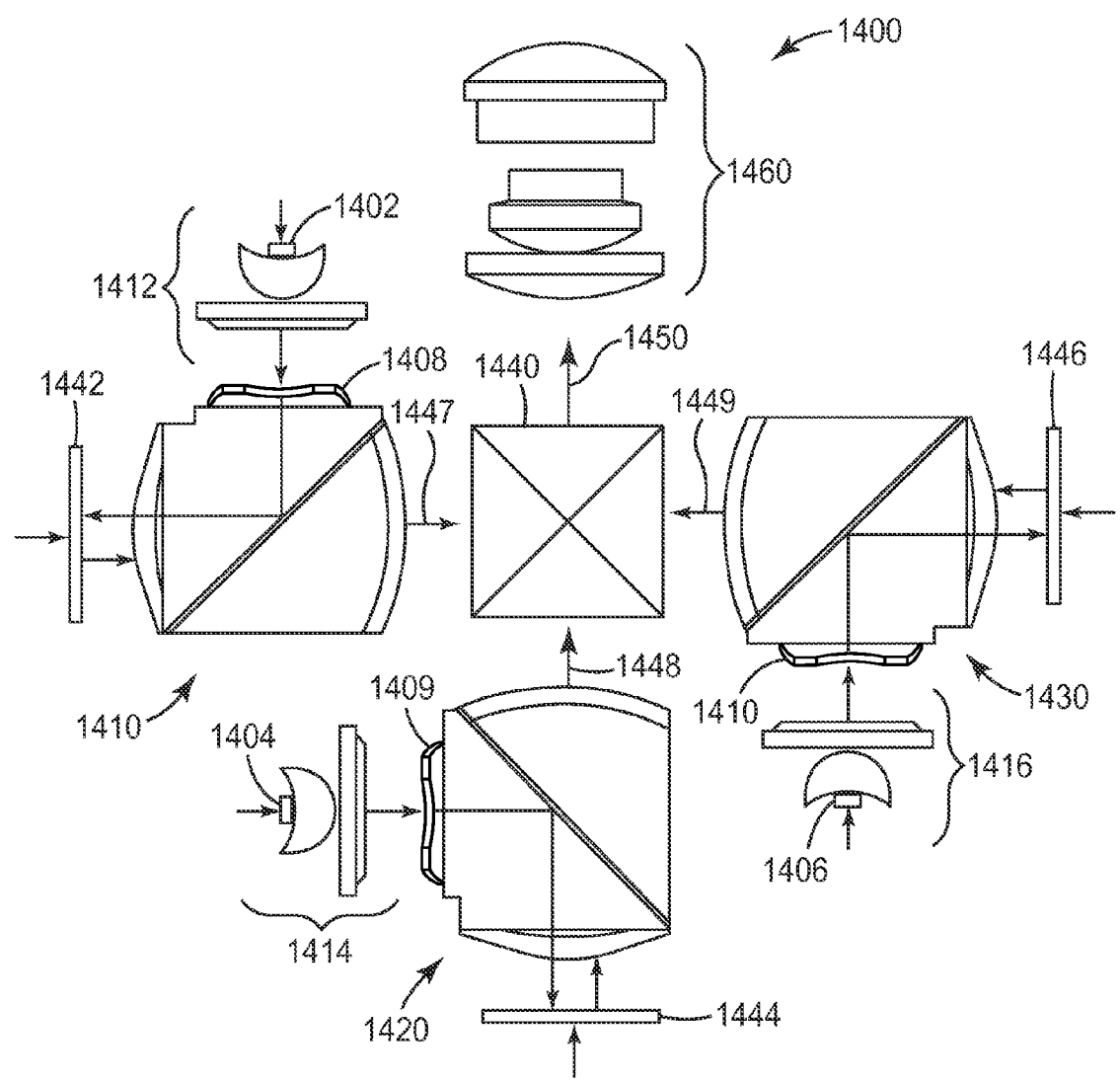
FIG. 14 is a top view of a projection system including three color channels.

In another embodiment shown in FIG. 14, a three-channel projection system 1400 includes three light emitters directing light to three different reflective imaging panels, such as LCoS imaging panels. Red light emitter 1402 is present in light source 1412, green light emitter 1404 is present in light source 1414 and blue light source 1406 is present in light source 1416. The components of the light sources 1412, 1414 and 1416 are similar to those discussed for light source 114 in FIG. 1. The output of each light source is directed to an anamorphic element 1408, 1409 and 1410, which also acts as a polarizing beam splitter, which in turn directs the light to image forming panels 1442, 1444 and 1446. The operations and details of the anamorphic elements 1408, 1409 and 1410 and image forming panels 1442, 1444 and 1446 are similar to those discussed with respect to FIG. 1. Image beams 1447, 1448 and 1449 from the respective assemblies 1410, 1420 and 1430 are directed toward a color combiner 1440, such as a cross-dichroic combiner, such as known combiners composed of right-angled prisms coated with dichroic coatings. The combined image beam 1450 is then directed to a projection lens assembly 1460. The space shown in FIG. 14 between assemblies 1410, 1420 and 1430 and the color combiner 1440 is optional and is typically not present. In an embodiment where the assemblies 1410, 1420 and 1430 abut the color combiner 1440, a lens or optical surface is provided at the exit face of the color combiner 1440. It will be appreciated that the three channel configuration of FIG. 14 using reflective imaging panels could be adapted other types of imaging systems, such as the digital micro-mirror imaging system of FIG. 10 and the transmissive imaging system of FIG. 11.

EXAMPLES

Figure 12:
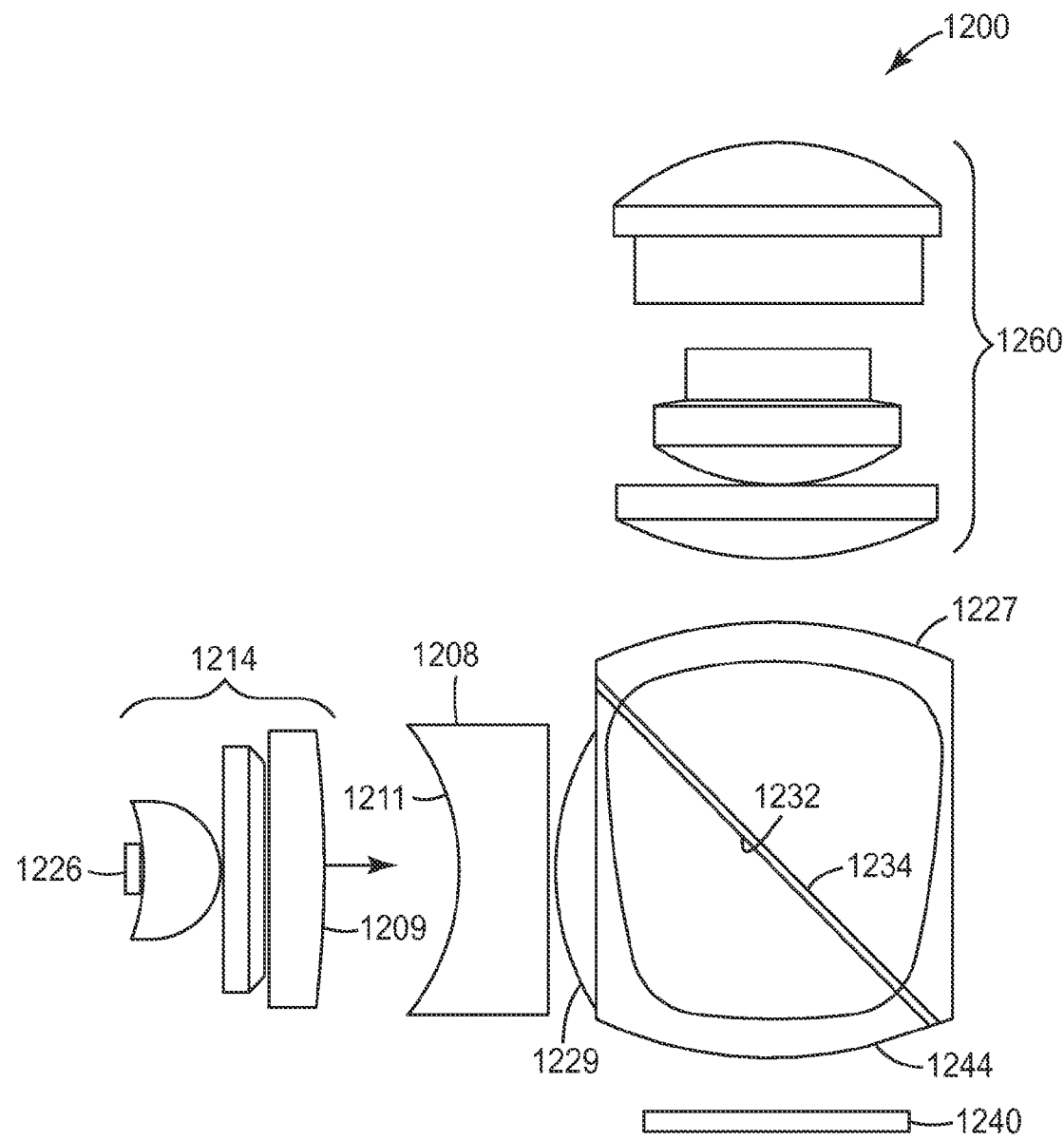
FIG. 12 is a top view of a mobile projection system including a dual cylinder lens prior to the entrance face of a polarizing beam splitter.
Figure 13:
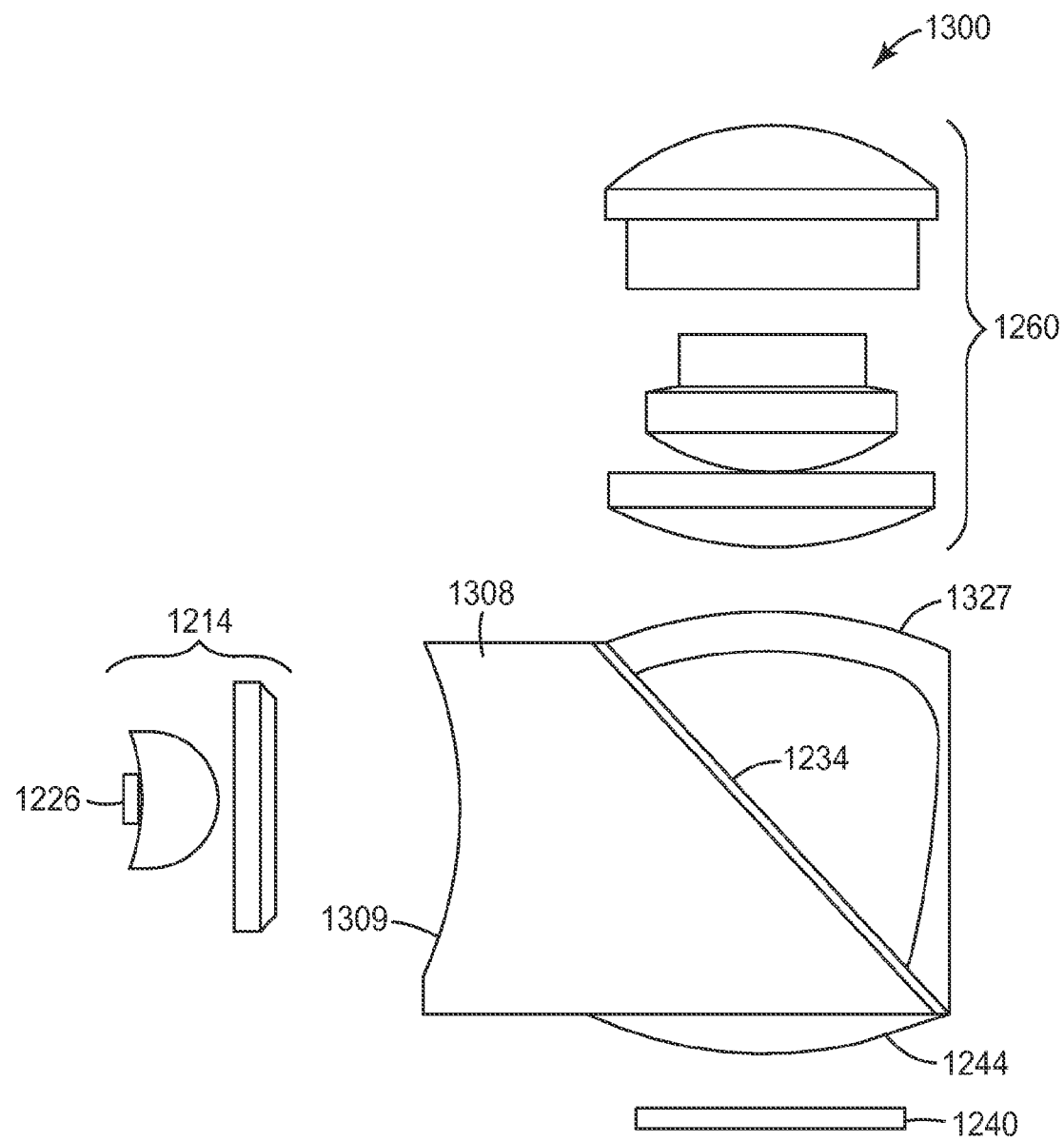
FIG. 13 is a top view of a mobile projection system including a cylinder lens as an entrance face for a polarizing beam splitter.

FIGS. 12 and 13 illustrate two alternative designs for an anamorphic element in a projection system, where the anamorphic elements in FIGS. 12 and 13 do not have a toric surface. Various features of the systems of FIGS. 1, 12 and 13 were tested empirically and simulated using TracePro® optical modeling software available from Lambda Research Corporation of Littleton, Mass. Comparisons were made of different characteristics of the three systems, as shown below in Table 1.

TABLE 1

Comparison of Configurations of FIGS. 1, 12, and 13

| Configuration | Simulated Efficiency at LCoS | Simulated RI @ 95% Field | Illumination Path Length | Measured Efficiency at Screen | Measured RI @ 90% Field |
|---|---|---|---|---|---|
| FIG. 12 | 33.7% | 34% | 32.9 mm | 6.56% | 18.2% |
| FIG. 13 | 28.1% | 49.2% | 34.3 mm | 5.7% | 35% |
| FIG. 1 | 31.0% | 48.2% | 26.8 mm | 6.75% | 37.8% |

Compared to the configurations of FIGS. 12 and 13, the illumination path length and overall volume of the configuration of FIG. 1 are decreased. Also, the configuration of FIG. 1 as built and measured achieves higher efficiency and better relative illumination (RI).

FIG. 12 is a top view of a mobile projection system 1200 including a dual cylinder lenses that act as an anamorphic element prior to the entrance face of a polarizing beam splitter (PBS) 1227. The light source 1214 includes an emitter 1226 that directs a light beam to cylinder lens 1209, which in turn directs light to a second, crossed cylinder lens 1208 having face 1211. The PBS 1227 includes a convex entrance face 1229 and a reflective polarizing layer 1234 on an incident surface 1232. The reflective polarizing layer 1234 directs the light toward the LCoS image panel 1240, which in turn directs the image beam back through the PBS 1227 and through the projection lens assembly 1260.

FIG. 13 is a top view of a mobile projection system 1300 which is similar to the system of FIG. 12, but instead of a dual cylinder lens 1208, a cylinder lens 1308 is incorporated into the entrance face 1309 of the PBS 1327.

The system of FIG. 1 that was tested empirically and by optical modeling includes a solid state light emitter which is a white LED made with a blue InGaN die, part number C450-EZ1000-530000, plus a conformal yellow phosphor, produced by Cree, Inc. (4600 Silicon Drive, Durham, N.C. 27703). The collection lens, and its coupling to the LED, is described in US Patent Publication US 2007/0152231. The collimator is a Fresnel lens having a non-faceted side for receiving the non-collimated beam and a faceted side for emitting the collimated beam. For the empirically tested system, the anamorphic element 110 was made using a plastic material and the first outer surface was shaped using a lathe. The reflective polarizing film within the PBS is manufactured by 3M Company (St. Paul, Minn. 55144) under the trade designation "VIKUITI" advanced polarizing films (APF). The image-forming device is an LCoS microdisplay with internal red, green and blue color filters, part number HX7007ATBFA, produced by Himax Display (2F, No. 26, Zih Lian Road, Tree Valley Park, Sinshih, Tainan County 74445, Taiwan). This system has a resolution of 640 pixels by 480 pixels, and an aspect ratio of the image panel of 4:3.

Values of simulated efficiency at the LCoS panel and simulated relative illumination (RI) at 95% Field, shown in the second and third columns of Table 1, were determined using the TracePro® optical modeling software. The simulated efficiency at the LCoS imaging panel is a ratio of the light received at the LCoS panel to the light output by the light source. The simulated relative illumination at 95% field is a ratio of the illumination taken at a first point compared to the illumination at the center of the LCoS panel. If a line is drawn from the center to a corner of the LCoS panel, the first point is located at 95% of the distance from the center toward the corner along that line. This calculation was made for four points along lines drawn to each corner, and the results were averaged. A similar calculation method was used for the measured relative illumination at 90% field. During the empirical measurements, an all white image was projected on a screen surface. The image diagonal size was 23 inches. Measurements were taken with a Minolta CL-200 light meter.

Various modifications and alterations of this invention will be apparent to those skilled in the art without departing from the scope and spirit of this invention, and it should be understood that this invention is not limited to the illustrative embodiments set forth herein. All U.S. patents, patent application publications, and other patent and non-patent documents referred to herein are incorporated by reference, to the extent they are not inconsistent with the foregoing disclosure.

What is claimed is:

1. An image forming system comprising:
a light source that provides a light beam;
an anamorphic refractive optical element comprising a first outer surface for facing the light source and an incident surface, wherein the first outer surface includes a toric surface, wherein the refractive optical element is configured so that the light beam is incident on the first outer surface and then the incident surface; and
a digital micro-mirror imager;
wherein the anamorphic element directs the light beam to the digital micro-mirror imager.

2. The system of claim 1 wherein the toric surface is generated by revolution of a curve described by a polynomial.

3. The system of claim 1 wherein the first outer surface further comprises a first facet cut surface.

4. The system of claim 3 wherein the first facet cut surface is a cylindrical surface.

5. The system of claim 3 wherein the first outer surface further comprises a second facet cut surface.

6. The system of claim 5 wherein the first facet cut surface and second facet cut surface are cylindrical surfaces.

7. The system of claim 6 wherein the first facet cut surface has a first cylindrical diameter and the second facet cut surface has a second cylindrical diameter different than the first cylindrical diameter.

8. The system of claim 1 wherein the first outer surface comprises a plurality of facets of differing optical power.

9. The system of claim 1 wherein a relative efficiency of the image forming system measured at a viewing surface is at least about 5% and a relative illumination of image forming system at the viewing surface is at least about 30%.

* * * * *